(12) United States Patent
Ghidini

(10) Patent No.: US 7,695,025 B2
(45) Date of Patent: Apr. 13, 2010

(54) TUBE COUPLING

(75) Inventor: Gualtiero Ghidini, Bione (IT)

(73) Assignee: DARVAS S.r.l., Brescia (IT)

( * ) Notice: Subject to any disclaimer, the term of this patent is extended or adjusted under 35 U.S.C. 154(b) by 0 days.

(21) Appl. No.: 11/908,680

(22) PCT Filed: Mar. 16, 2006

(86) PCT No.: PCT/IT2006/000164

§ 371 (c)(1),
(2), (4) Date: Apr. 2, 2008

(87) PCT Pub. No.: WO2006/097969

PCT Pub. Date: Sep. 21, 2006

(65) Prior Publication Data

US 2008/0277922 A1 Nov. 13, 2008

(30) Foreign Application Priority Data

Mar. 17, 2005 (IT) .......................... BS2005A0041

(51) Int. Cl.
*F16L 21/06* (2006.01)
(52) U.S. Cl. .................. 285/322; 285/243; 285/359
(58) Field of Classification Search ......... 285/242–243, 285/314, 322–323, 358–359, 394–395
See application file for complete search history.

(56) References Cited

U.S. PATENT DOCUMENTS

| | | | | |
|---|---|---|---|---|
| 1,545,680 A | * | 7/1925 | Moore ..................... | 285/142.1 |
| 1,746,956 A | * | 2/1930 | Metcalf, Jr. .................. | 285/323 |
| 3,248,135 A | * | 4/1966 | Meripol ....................... | 285/323 |
| 3,498,647 A | * | 3/1970 | Schroder ..................... | 285/343 |
| 3,501,177 A | * | 3/1970 | Jacobs ......................... | 285/322 |
| 3,552,781 A | * | 1/1971 | Helland ....................... | 285/322 |
| 4,445,714 A | * | 5/1984 | Kisiel, III ..................... | 285/23 |
| 4,712,813 A | * | 12/1987 | Passerell et al. ............. | 285/250 |
| 4,722,560 A | * | 2/1988 | Guest .......................... | 285/323 |
| 4,875,715 A | * | 10/1989 | Dennany et al. .............. | 285/87 |
| 5,121,949 A | * | 6/1992 | Reese .......................... | 285/255 |
| 5,593,186 A | * | 1/1997 | Harris .......................... | 285/23 |
| 6,974,162 B2 | * | 12/2005 | Chelchowski et al. .... | 285/382.7 |

FOREIGN PATENT DOCUMENTS

| | | |
|---|---|---|
| EP | 0 200 339 | 12/1986 |
| EP | 0 945 662 A2 | 9/1999 |
| FR | 860 216 | 1/1941 |
| FR | 2 283 380 | 3/1976 |

* cited by examiner

*Primary Examiner*—Aaron M Dunwoody
*Assistant Examiner*—Fannie Kee
(74) *Attorney, Agent, or Firm*—McGlew and Tuttle, P.C.

(57) ABSTRACT

A coupling for tubes with a body with a neck (14) provided with two or more longitudinal recesses (15) and each of which is positioned a jaw (12) able to move radially between an expanded release position and a contracted lock position. The jaws can move from one position to the other by means of cam surfaces (24) provided inside a tightening nut (13) assembled and susceptible to partial rotation on the neck of the coupling body. Furthermore the nut has means for interacting with the neck to block it and prevent it from turning in the release direction.

20 Claims, 5 Drawing Sheets

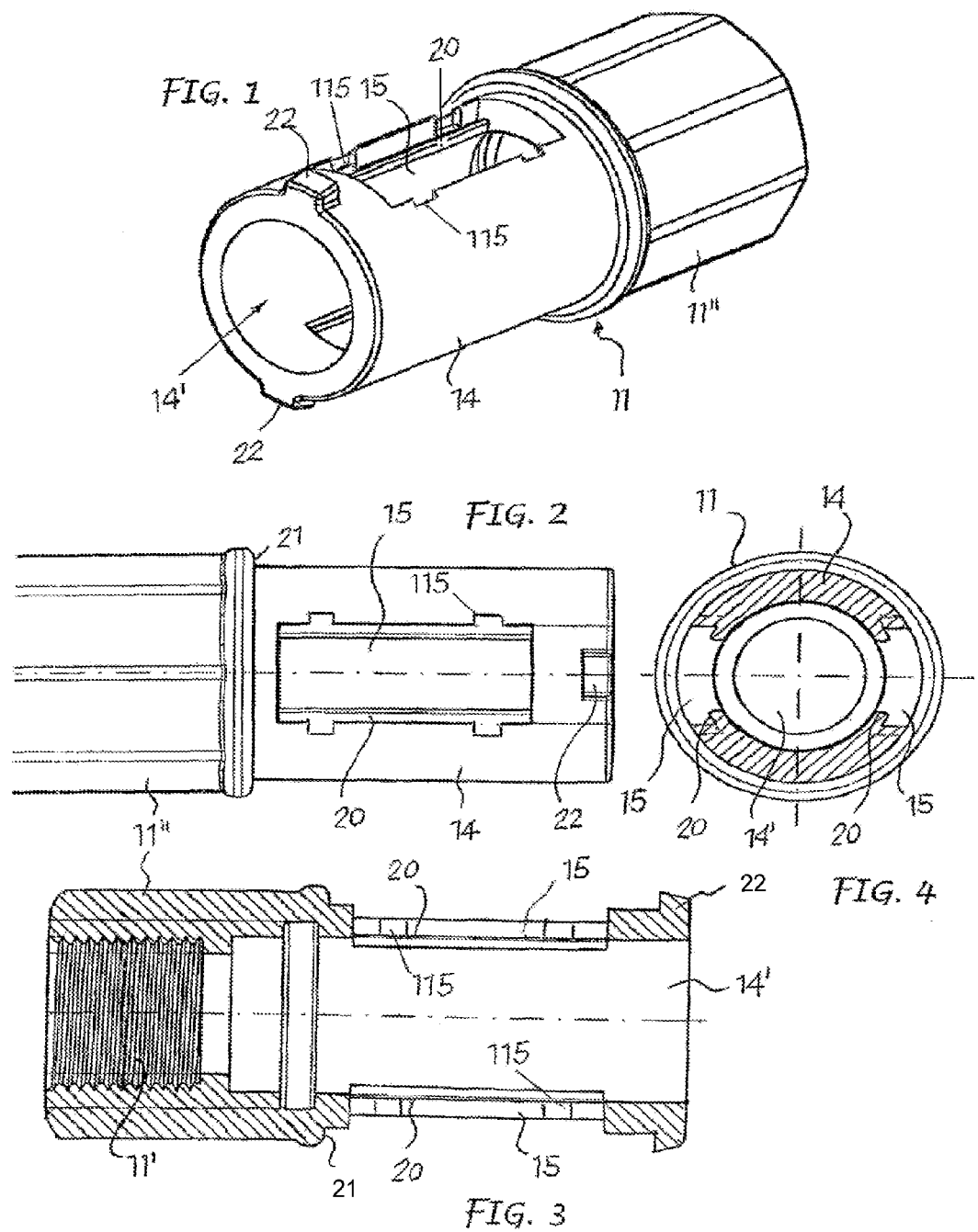

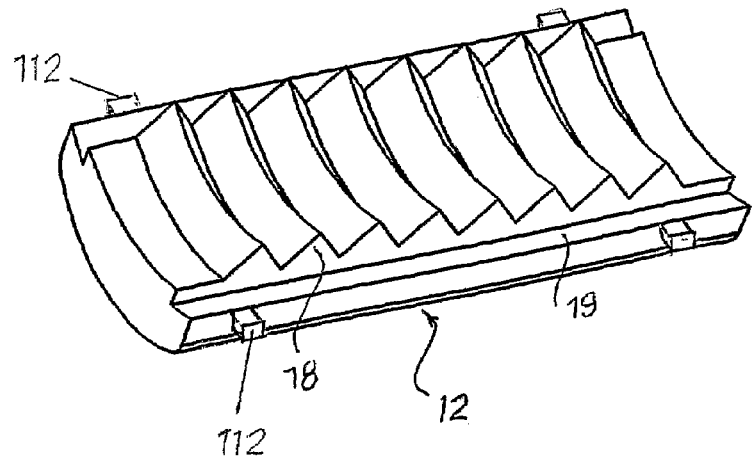
FIG. 8
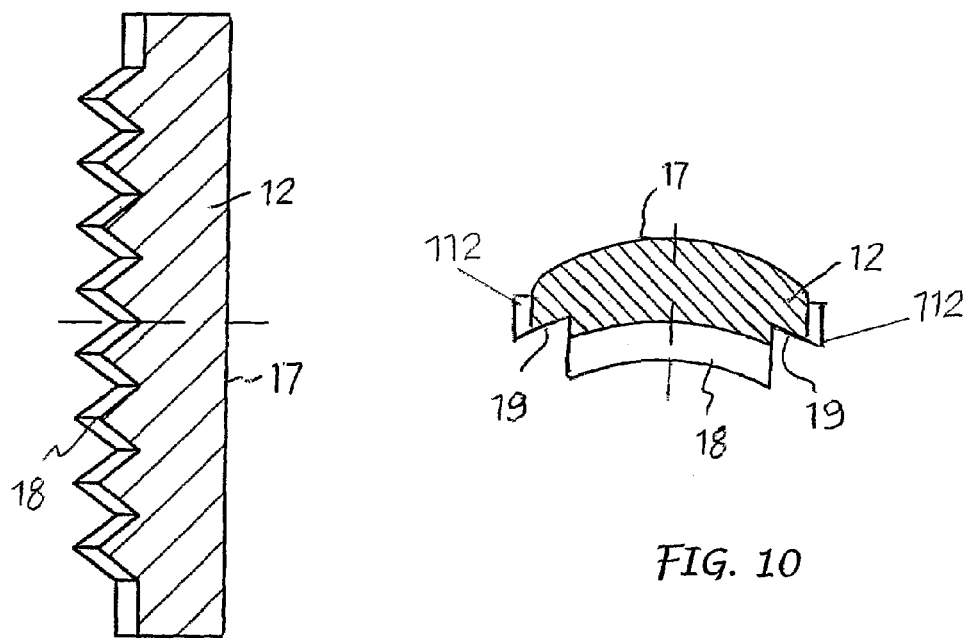
FIG. 9
FIG. 10

FIG. 14
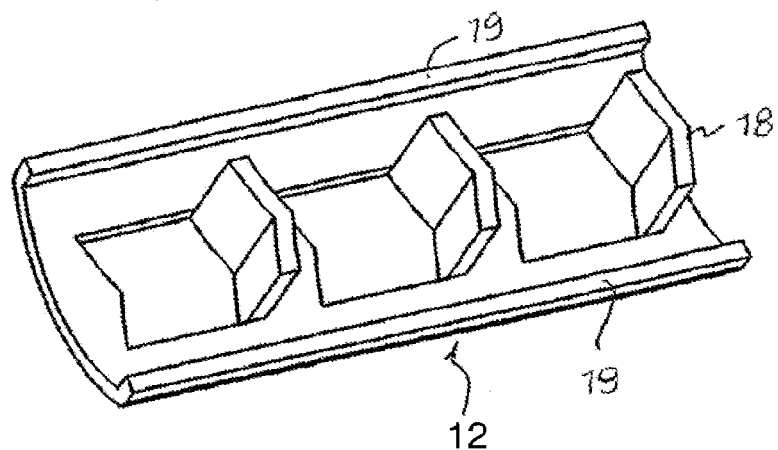
FIG. 15
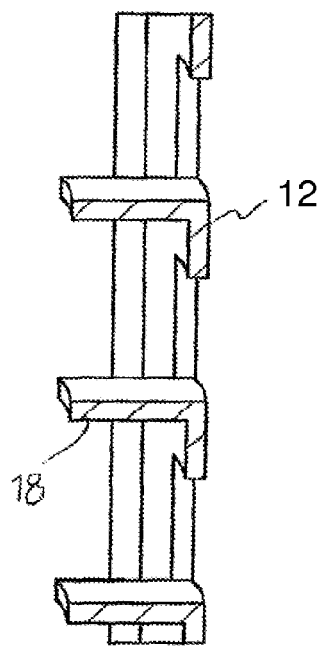
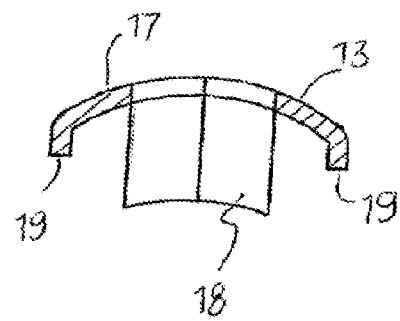
FIG. 16

TUBE COUPLING

FIELD OF THE INVENTION

This invention concerns a coupling for metal, plastic or multi-layer tubes for plumbing, both in sanitation and heating systems.

STATE OF THE TECHNIQUE

The type of coupling here considered can be straight, female or male, straight intermediate, an elbow joint, T or Y etc., used to be connected together or to other components of pipes used in water systems but not only. At present there are many and well known types available on the market, for example threaded couplings, compression joints, press-fittings, rapid fittings and so on. Usually these couplings have at least one ring locking element to tighten around the end of the pipe, with the help of a conical threaded nut or press-fitting to enable it to grip on the external surface of the pipe.

Usually, with pipes with a metal core and at least one external coating, tightening of the blocking element must be adjusted so that it only partially cuts into the covering and does not cut through it and come into contact with the metal part of the pipe. Furthermore with these types of tube it is necessary to avoid contact with the fluid flowing through the metal pipe, the free end of which is normally bare.

OBJECTS AND SUMMARY OF THE INVENTION

A first object of this invention is to provide a coupling for pipes which has a new concept and has a simple, rapid and efficient block/release system, involving only a partial rotation of one component on and with respect to another.

A second object of the invention is to provide a new, original coupling for pipes using gripping elements that engage the pipe to be blocked only for a part of its length without however encompassing it.

A further object of the invention is to provide a coupling for pipes that can be made not only of metal, such as brass or steel, but also totally or partially of a synthetic material, produced by molding or some other forming technique.

Another object of the invention is to provide a coupling suitable both for metal and plastic material pipes, but in particular for connecting multilayer pipes, the coupling being equipped with physical means to limit the level of tightening of the gripping elements, so that they do not cut through the layer of external coating in that type of pipe.

Another object of the invention is to provide a coupling which is reliable when in use in that it cannot be accidentally released and moreover its sealing capacity increases when operating under high pressure.

Yet another object of the invention is to provide a coupling which is easy to use in as much as its components always maintain their correct position even when the coupling is released and is packed and handled.

Said objects and subsequent practical and functional advantages are reached, according to the invention, by a coupling for tubes that includes jaws that move in a radial direction of a hollow cylindrical body of a coupling body.

BRIEF DESCRIPTION OF THE DRAWINGS

The invention will however be described more in detail with reference to the enclosed indicative and not limiting drawings, in which:

FIG. 1 shows a view in perspective of only the coupling body;

FIGS. 2 and 3 show, respectively, a side view and a longitudinal section of the coupling body;

FIG. 4 shows a cross section level with the neck of the coupling body of FIG. 1;

FIG. 8 shows a view in perspective of a jaw;

FIGS. 9 and 10 show, respectively, a longitudinal section and a cross section of the jaw in FIG. 8;

FIG. 14 shows a view in perspective of a construction variation of the jaw, and FIGS. 15 and 16 show, respectively, the side views and cross section of the jaw in FIG. 14.

DETAILED DESCRIPTION OF THE INVENTION

Figure 5:
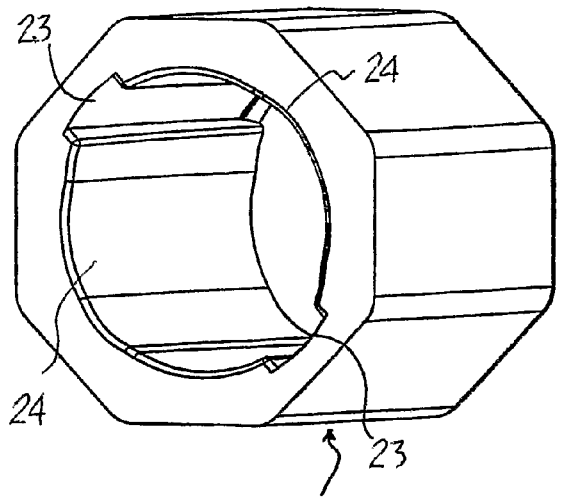
FIG. 5 shows a view in perspective of the tightening nut.
Figure 7:
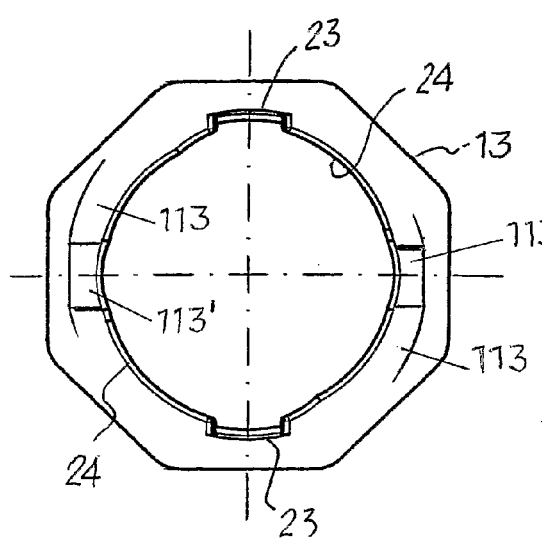
FIGS. 6 and 7 show the tightening nut seen from one end and a longitudinal section respectively of FIG. 5.
Figure 6:
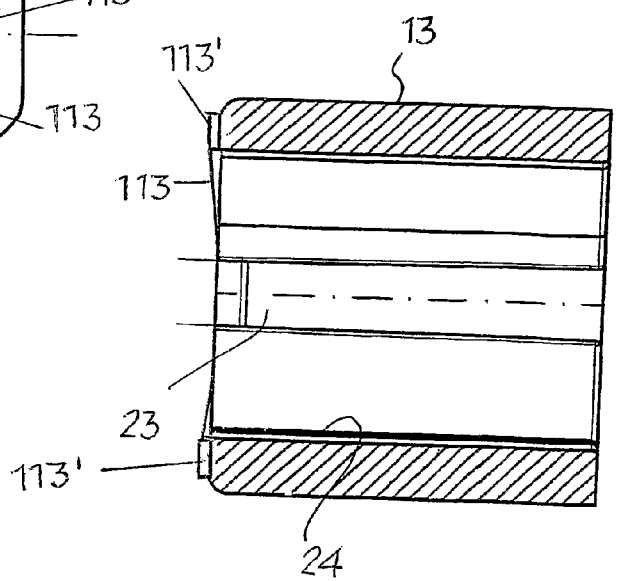
Figure 11:
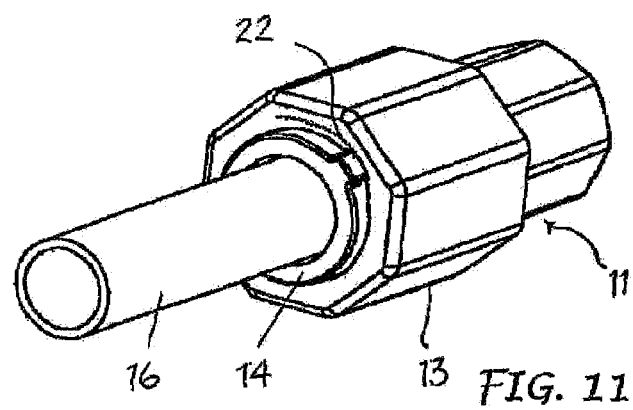
FIG. 11 shows a view in perspective of the coupling assembled complete with pipe.
Figure 12:
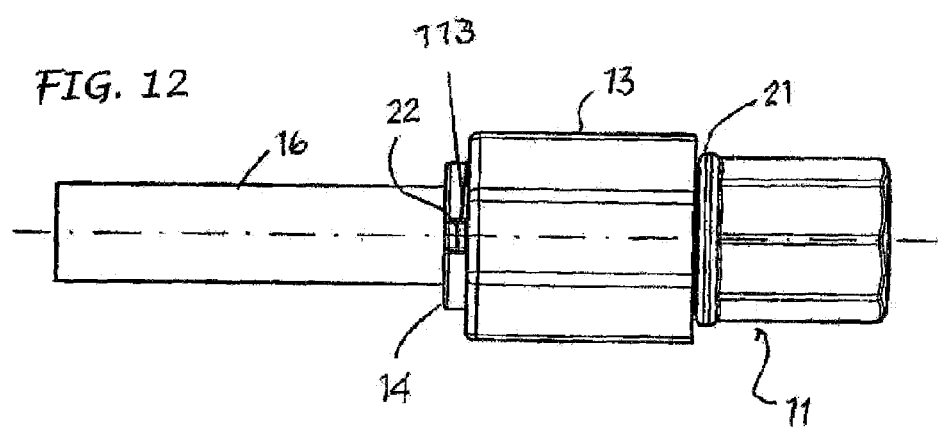
FIGS. 12 and 13 show, respectively, a side view and a longitudinal section of the assembly in FIG. 11.
Figure 13:
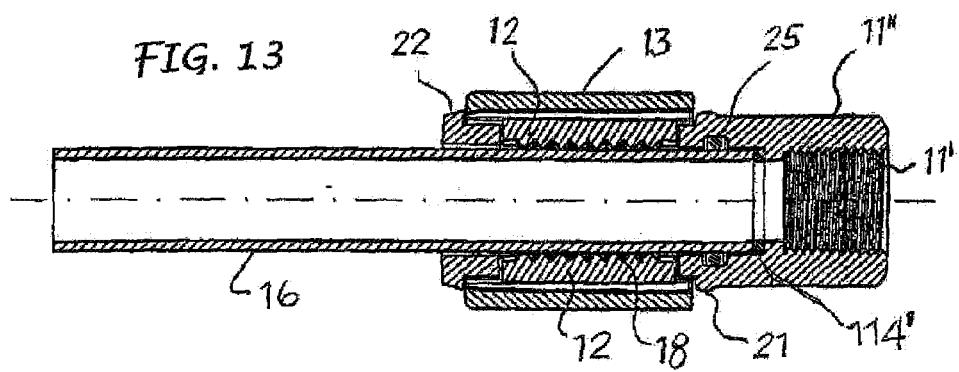

The coupling subject of this invention comprises a coupling body 11, at least two jaws 12 and a tightening nut 13.

The body 11 can be straight, an elbow, a T, a Y coupling or the like. In the example shown it is straight (as shown in FIGS. 1-4) and has, in one part of it, a hollow, cylindrical neck 14 in the walls of which are machined, longitudinal recesses 15 spaced at an angle to each other. In the case in question there are two diametrally opposite recesses 15, and the neck 14 forms a housing 14' with an internal diameter compatible with the diameter of the pipe 16 to be connected. On the other side, the body 11 can have a completely similar neck (thus forming a double coupling) or a threaded female section 11' as shown or a male threaded section. In any case, the body 11 can also have an external polygonal part 11", better if hexagonal, to facilitate gripping with a tool.

The jaws 12 are rectilinear and each one is housed in a recess 15 of the neck 14 of the coupling body 11 with the possibility of moving radially between an expanded release position and a contracted locking one. In the release position the jaws are moved towards the outside of the neck and when in the locked position towards the axis of the neck.

Each jaw 12 (as shown in FIGS. 8 and 14) has the shape of a cylindrical section with a diameter compatible with that of the pipe 16 to be blocked. It has a smooth external surface 17 and a toothed internal one with a series of serrated gripper teeth 18, parallel to each other and oriented crossways to the jaw itself.

On each of the longitudinal sides, that is from opposite sides of the teeth 18, each jaw 12 has a supporting plane 19 made to rest on a facing locator step 20 cut along each side of every recess 15 so as to set the maximum movement position of the jaw towards the contracted locking position.

Furthermore, each longitudinal side of each jaw 12 has at least one tab 112 made to fit into a corresponding indent 115 provided in the relative side of the recess 15 so as to prevent the jaw from moving, tilting and falling inside the neck, which would prevent the pipe from entering, thus obstructing the immediate use of the coupling on the part of the user.

The tightening nut 13 is placed around the neck 14 of the coupling body 11 and has in preference a hexagonal external surface to facilitate gripping by a maneuvering tool. It is held axially on the neck 14, but has the possibility to turn, between an annular shoulder 21 at the base of the neck and the radial locking lugs 22 at the free end of the neck itself.

Internally, the tightening nut 13 has lengthwise, as many grooves 23 as jaws 12 associated with the neck 14 of the coupling body 11. Starting from each groove 23, the tightening nut 13 has also a cam thrust surface 24 provided to engage with the external surface 17 of each jaw 12.

On the head of the tightening nut 13 in the area between the grooves 23, there is at least one upward ramp 113 terminating in a front anti-release indent 113'. Preferably the ramps 113 are the same number as the radial locking lugs 22 of the neck 14 of the coupling body.

All the components 11, 12, 13 of the coupling can advantageously be made of a suitable plastic material. However, where it is considered necessary and opportune, al least the jaws 12 can be made out of a metal, such as for example brass or steel.

The gripper teeth 18 are triangular in shape for assembly and bidirectional use of the jaws. However in the case of steel serrated gripper teeth 18 they can be a different shape and made by shearing and bending as shown in FIGS. 14-16.

In practice, when the tightening nut 13 is turned and its internal grooves 23 coincide with the jaws 12, the latter can expand into the locking position. In such a condition, the pipe 16 in question can be connected to the coupling or, if already connected can be disconnected.

The pipe is connected to the coupling by inserting one of its ends into the neck 14, where it is seal fitted with the help of at least one annular seal 25. The pipe 16 is then blocked in the coupling body following a partial turn of the tightening nut 13. By turning in this way, the internal cam 24 surfaces of the tightening nut 13 push the jaws 12 radially towards the pipe or the contracted blocking position where their serrated gripper teeth 18 engage the external surface of the pipe, blocking it firmly without it having the possibility either to turn or to slip out axially even in the presence of a fluid under pressure passing through the pipe. However the maximum gripping depth of the pipe by the serrated teeth 18 will be limited by the support of the lateral plane surface 19 of the jaws 12 on the lateral locator steps 20 of the indents 115 which house them to prevent the serrated teeth 18 from cutting through the pipe protective coating when the pipe is multilayer with an external coating.

Following the rotation the lugs 22 at the end of the neck begin to move up the upward ramps 113 on the head of tightening nut 13 until they fit into the anti locking 113' indents, compelling the body of the coupling to fit completely and tightly on the pipe. These indents stop the nut from turning backwards in the releasing direction, ensuring the coupling-pipe joint.

It should also be noted that on the bottom of the housing 14' which receives the pipe, a seal 114' is provided to act against the end of the pipe. This seal, due to its elasticity, forms a seal on the end of the pipe even when the pipe moves backwards when it is subjected to operating pressure. Furthermore, in the case of multilayer pipes, this seal 114' also helps to prevent the fluid coming into contact with the metal core of the pipe as is required by regulations.

The invention claimed is:

1. A coupling for metal, plastic material or multilayer tubes, the coupling comprising:
   a coupling body comprising a hollow cylindrical neck on at least one end thereof, said coupling body forming a sealed housing for one end of a pipe, said hollow cylindrical neck comprising at least two longitudinal recesses spaced at an angle with respect to each other and at least two radial lugs, said at least two radial lugs being arranged on a free end of said hollow cylindrical neck;
   a tightening nut assembled and turning around the hollow cylindrical neck of said coupling body; and
   a plurality of jaws, each of said jaws having an external thrust surface and one or more serrated gripper teeth facing radially inward, each of said jaws being movable in a radial direction of said neck such that each of said jaws moves between an extended release position and a contracted locking position, said contracted locking position being defined by locator steps on at least two lateral sides of each recess, said tightening nut comprising inner cam thrust surfaces, said cam thrust surfaces interacting with said external thrust surface of the jaws such that each jaw moves from the expanded release position to the contracted lock position in response to a partial turn of said tightening nut on the neck of the coupling body, said tightening nut comprising a head portion, said head portion comprising anti-release indents, said anti-release indents interacting with said radial lugs such that said anti-release indents and said radial lugs stop said tightening nut from turning in a release direction once said tightening nut has been locked.

2. A coupling for tubes according to claim 1, in wherein said tightening nut has internal longitudinal grooves, said internal longitudinal grooves being positioned in line with the jaws such that said jaws move into said release position when said internal longitudinal grooves are aligned with said jaws, each cam thrust surface extending peripherally from one of said longitudinal grooves.

3. A coupling for tubes according to claim 1, wherein said tightening nut is assembled and turns on the neck of the body of the coupling without translating axially, said hollow cylindrical neck comprising a base portion and an annular shoulder located at said base portion, said tightening nut being held between said annular shoulder and said radial lugs.

4. A coupling for tubes according to claim 1, wherein said head portion of said tightening nut comprises a plurality of upward ramps, each of said anti-release indents being associated with one of said upward ramps, each of said upward ramps interacting with one of said radial lugs such that said coupling body moves in an axial direction.

5. A coupling for tubes according to claim 1, wherein each of said jaws is in the shape of a cylindrical sector with a smooth external surface and an internal surface, said smooth external surface forming said external thrust surface, said internal surface being provided with said one of said one or more serrated gripper teeth positioned in parallel to another one of said one or more serrated gripper teeth, said serrated gripper teeth being oriented in a transverse direction of said jaw.

6. A coupling for tubes according to claim 5, wherein each of said jaws has at least two lateral supporting planes, each of said lateral locator steps interacting with one of said supporting planes to form a maximum movement position of the jaws towards the contracted lock position.

7. A coupling for tubes according to claim 1, further comprising a seal and a pipe, said seal being arranged between an inner surface of said hollow cylindrical neck and a free end of said pipe.

8. A coupling for tubes according to claim 1, wherein said one or more serrated gripper teeth of each jaw have a triangular cross section.

9. A coupling for tubes according to claim 8, wherein said jaws are composed of brass.

10. A coupling for tubes according to claim 1, wherein said one or more serrated gripper teeth of each jaw are sheared and bent from a starting element.

11. A coupling for tubes according to claim 10, wherein said jaws are composed of steel.

12. A coupling for metal, plastic material or multilayer tubes, the coupling comprising:
a tube;
a coupling body comprising a hollow cylindrical neck on at least one of end thereof, said hollow cylindrical neck having a longitudinal axis, said coupling body receiving one end of said tube, said coupling body sealing said one end of said tube, said hollow cylindrical neck having an outer surface, an inner surface and lateral locator step portions, each of said locator step portions being located adjacent to said outer surface and said inner surface, said inner surface, said outer surface and said lateral locator step portions defining at least two longitudinal recesses spaced at an angle with respect to each other, said cylindrical neck having at least two radial lugs, said at least two radial lugs being arranged on a free end of said hollow cylindrical neck;
a tightening nut mounted on said hollow cylindrical neck of said coupling body for movement such that said tightening nut moves about said hollow cylindrical neck from an unlocked position to a locked position; and
a plurality of jaws, each of said jaws having an external thrust surface and a plurality of serrated gripper teeth, each of said serrated gripper teeth facing in a direction of said tube, each of said jaws being movable in a radial direction with respect to said longitudinal axis of said hollow cylindrical neck such that each of said jaws moves between an extended release position and a contracted locking position, said contracted locking position being defined by said lateral locator steps, said tightening nut comprising inner cam thrust surfaces located on an interior portion thereof, one of said cam thrust surfaces engaging said external surface of one of the jaws and another one of said cam thrust surfaces engaging said external surface of another one of the jaws such that each jaw moves from the expanded release position to the contracted lock position when said tightening nut moves from said unlocked position to said locked position, said tightening nut comprising a head portion, said head portion comprising a plurality of anti-release indents, each of said anti-release indents receiving one of said radial lugs when said tightening nut is in said locked position, wherein said tightening nut cannot move in a release direction via said anti-release indents and said radial lugs when said tightening nut is in said locked position.

13. A coupling for tubes according to claim 12, wherein said tightening nut has internal longitudinal grooves, said internal longitudinal grooves being aligned with the jaws such that said jaws move into said release position when said internal longitudinal grooves are aligned with said jaws, each of said cam thrust surfaces extending peripherally from one of said longitudinal grooves.

14. A coupling for tubes according to claim 12, wherein said tightening nut moves from said unlocked position to said locked position without translating axially, said hollow cylindrical neck comprising a base portion and an annular shoulder located at said base portion, said tightening nut being held between said annular shoulder and said radial lugs.

15. A coupling for tubes according to claim 12, wherein said head portion of said tightening nut comprises a plurality of upward ramps, each of said anti-release indents being located adjacent to one of said upward ramps, each of said upward ramps engaging one of said radial lugs when said tightening nut moves from said unlocked position to said locked position such that said coupling body moves towards an end of the tube.

16. A coupling for tubes according to claim 12, wherein each of said jaws comprises a cylindrical sector with a smooth external surface and an internal surface, said smooth external surface forming said external thrust surface, said internal surface being provided with said plurality of serrated gripper teeth, each of said serrated gripper teeth being positioned in parallel to another one of said serrated gripper teeth, each of said serrated gripper teeth being oriented in a transverse direction of said jaw.

17. A coupling for tubes according to claim 16, wherein each of said jaws has at least two lateral supporting planes, each of said lateral locater steps engaging with one of said supporting planes when said jaws are in said contracted lock position to define a maximum movement position of the jaws.

18. A coupling for tubes according to claim 12, further comprising a seal, said seal being arranged between a bottom portion of said hollow cylindrical neck and said one end of said pipe.

19. A coupling for metal, plastic material or multilayer tubes, the coupling comprising:
a coupling body comprising a hollow cylindrical neck on at least one end thereof, said hollow cylindrical neck having a longitudinal axis, said coupling body forming a sealed housing for one end of a pipe, said hollow cylindrical neck comprising locator steps, at least two longitudinal recesses spaced at an angle with respect to each other and at least two radial lugs, said locator steps defining at least a portion of said two longitudinal recesses, said at least two radial lugs being arranged on a free end of said hollow cylindrical neck;
a tightening nut mounted to said hollow cylindrical neck for movement such that said tightening nut moves about said hollow cylindrical neck from an unlocked position to a locked position; and
a plurality of jaws, each jaw having an external thrust surface and a plurality of serrated gripper teeth, each of said jaws being movable in a radial direction with respect to said longitudinal axis of said neck such that each jaw moves between an extended release position and a contracted locking position, each jaw being in contact with one or more of said locator steps in said contracted locking position, said tightening nut comprising inner cam thrust surfaces, one of said inner cam thrust surfaces engaging said external surface of one of said jaws and another one of said inner cam thrust surfaces engaging said external surface of another one of said jaws such that each of said jaws moves from the expanded release position to the contracted lock position when said tightening nut moves from said unlocked position to said locked position, said tightening nut comprising a head portion, said head portion comprising a plurality of anti-release indents, each of said anti-release indents receiving one of said radial lugs when said tightening nut is in said locked position such that said tightening nut is fixed via said anti-release indents and said radial lugs.

20. A coupling for tubes according to claim 19, wherein said head portion of said tightening nut comprises a plurality of upward ramps, each of said anti-release indents being located adjacent to one of said upward ramps, each of said upward ramps engaging one of said radial lugs when said tightening nut moves from said unlocked position to said locked position such that said coupling body moves in an axial direction.

* * * * *